(12) United States Patent
Holland et al.

(10) Patent No.: US 11,100,732 B2
(45) Date of Patent: Aug. 24, 2021

(54) ENHANCED SYSTEM FAILURE DIAGNOSIS

(71) Applicant: GM Global Technology Operations LLC, Detroit, MI (US)

(72) Inventors: Steven W. Holland, Saint Clair, MI (US); Varsha K. Sadekar, Detroit, MI (US); Joshua J. Sanchez, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 266 days.

(21) Appl. No.: 16/418,587

(22) Filed: May 21, 2019

(65) Prior Publication Data
US 2020/0372731 A1 Nov. 26, 2020

(51) Int. Cl.
*G07C 5/08* (2006.01)
*G05B 23/02* (2006.01)
*B60W 50/02* (2012.01)

(52) U.S. Cl.
CPC ....... *G07C 5/0808* (2013.01); *B60W 50/0205* (2013.01); *G05B 23/0278* (2013.01)

(58) Field of Classification Search
CPC ............. G07C 5/0808; G05B 23/0278; B60W 50/0205
See application file for complete search history.

(56) References Cited

U.S. PATENT DOCUMENTS

| | | | |
|---|---|---|---|
| 6,543,007 B1* | 4/2003 | Bliley | G06F 11/2257 701/32.1 |
| 2010/0217478 A1* | 8/2010 | Zhang | G07C 5/006 701/31.4 |
| 2012/0116630 A1* | 5/2012 | Howell | G06Q 10/0639 701/29.4 |
| 2013/0184929 A1* | 7/2013 | Salman | G05B 23/0283 701/31.5 |
| 2015/0052485 A1* | 2/2015 | Grounds | G06F 3/0482 715/830 |
| 2018/0306160 A1* | 10/2018 | Sankavaram | F02D 41/22 |

* cited by examiner

*Primary Examiner* — Michael V Kerrigan

(57) ABSTRACT

A method of diagnosing a root cause for an exhibited vehicle failure, comprises initiating a vehicle health management (VHM) algorithm, repeatedly monitoring, at a specified time interval, the state of health (SOH) for at least one vehicle component, wherein the SOH for the at least one vehicle component is one of Green (normal operation), Yellow, and Red, calculating a number of consecutive Green SOH results for the at least one vehicle component, and providing an indication of likelihood that the at least one vehicle component is not a root cause of the exhibited vehicle failure based on the number of consecutive Green SOH results for the at least one vehicle component.

20 Claims, 1 Drawing Sheet

ENHANCED SYSTEM FAILURE DIAGNOSIS

INTRODUCTION

The present disclosure relates to a vehicle health management (VHM) system and a method of reducing the number of unnecessary component replacements in response to an issue with the vehicle.

A vehicle health management system collects, and processes data related to various components within a vehicle. The data collected about the vehicle and components within the vehicle is used to identify the current state of health (SOH) of the vehicle and components therein.

Often, when a vehicle exhibits a problem, such as when the vehicle will not start, a diagnostic; process may lead a service technician to automatically look at the battery as a potential cause of the vehicle not starting. While there are multiple reasons that the vehicle may not start, the battery may be the most common reason, so the service technician starts there. The service technician may proceed with replacement of the battery, only to find that the vehicle will come back later with a no start condition once again. Then, the technician must move on to look at other potential causes for the vehicle not starting. Repeat visits cause wasted time for the service technician and the vehicle owner. Further, this causes increased warranty cost due to the cost of a wrongly replaced component, which was not actually the reason for the vehicle not starting.

Thus, while current VHM systems achieve their intended purposes, there is a need for a method for monitoring the continuous SOH of components that will provide an indication of the likelihood that a particular component is not the root cause of a failure mode within a vehicle.

SUMMARY

According to several aspects of the present disclosure, a method of diagnosing a root cause for an exhibited vehicle failure, comprises initiating a vehicle health management (VHM) algorithm, repeatedly monitoring, at a specified time interval, the state of health (SOH) for at least one vehicle component, wherein the SOH for the at least one vehicle component is one of Green, Yellow, and Red, calculating a number of consecutive Green SOH results for the at least one vehicle component, and providing an indication of likelihood that the at least one vehicle component is not a root cause of the exhibited vehicle failure based on the number of consecutive Green SOH results for the at least one vehicle component.

According to another aspect of the present disclosure, providing an indication of likelihood that the at least one vehicle component is not a root cause of the vehicle failure based on the number of consecutive Green SOH results for the at least one vehicle component further includes: providing no indication of the likelihood that the at least one vehicle component is not a root cause of the exhibited vehicle failure when the number of consecutive Green SOH results for the at least one vehicle component is less than a first pre-determined threshold.

According to another aspect of the present disclosure, providing an indication of likelihood that the at least one vehicle component is not a root cause of the vehicle failure based on the number of consecutive Green SOH results for the at least one vehicle component further includes: providing an indication that the at least one vehicle component is unlikely to be the root cause of the exhibited vehicle failure when the number of consecutive Green SOH results for the at least one vehicle component is at least equal to the first pre-determined threshold.

According to another aspect of the present disclosure, providing an indication of likelihood that the at least one vehicle component is not a root cause of the vehicle failure based on the number of consecutive Green SOH results for the at least one vehicle component further includes: providing an indication that the at least one vehicle component is highly unlikely to be the root cause of the exhibited vehicle failure when the number of consecutive Green SOH results for the at least one vehicle component is at least equal to a second pre-determined threshold, wherein the second pre-determined threshold is greater than the first pre-determined threshold.

According to another aspect of the present disclosure, initiating a vehicle health management (VHM) algorithm further includes: initiating the VHM algorithm whenever the engine of the vehicle is started.

According to another aspect of the present disclosure, initiating the VHM algorithm whenever the engine of the vehicle is started further includes: running the VHM algorithm whenever the engine of the vehicle is running.

According to another aspect of the present disclosure, the method further includes resetting the number of consecutive Green SOH results to zero when the engine of the vehicle has not been started for longer than a pre-determined time interval.

According to another aspect of the present disclosure, the method further includes resetting the number of consecutive Green SOH results to zero when the vehicle has not moved between consecutive engine starts.

According to another aspect of the present disclosure, initiating a VHM algorithm further includes: initiating communication between a controller and at least one sensor within the vehicle, wherein the controller is adapted to run the VHM algorithm, and the at least one sensor is adapted to monitor SOH conditions for the at least one vehicle component.

According to another aspect of the present disclosure, the controller is located remotely from the vehicle, and initiating communication between a controller and at least one sensor within the vehicle includes: initiating communication between a controller and at least one sensor within the vehicle via a wireless network.

According to several aspects of the present disclosure, a method of diagnosing a root cause for an exhibited system error, comprises repeatedly monitoring, at a specified time interval, the state of health (SOH) for at least one sub-system, wherein the SOH for the at least one sub-system is one of Green, Yellow, and Red, calculating a number of consecutive Green SOH results for the at least one sub-system, and providing an indication of likelihood that the at least one sub-system is not a root cause of the exhibited system error based on the number of consecutive Green SOH results for at least one sub-system.

According to another aspect of the present disclosure, providing an indication of likelihood that the at least one sub-system is not a root cause of the system failure based on the number of consecutive Green SOH results for the at least one sub-system further includes: providing no indication of the likelihood that the at least one sub-system is not a root cause of the exhibited system error when the number of consecutive Green SOH results for the at least one sub-system is less than ten.

According to another aspect of the present disclosure, providing an indication of likelihood that the at least one sub-system is not a root cause of the system error based on the number of consecutive Green SOH results for the at least one sub-system further includes: providing an indication that the at least one sub-system is unlikely to be the root cause of the exhibited system error when the number of consecutive Green SOH results for the at least one sub-system is at least ten.

According to another aspect of the present disclosure, providing an indication of likelihood that the at least one sub-system is not a root cause of the system error based on the number of consecutive Green SOH results for the at least one sub-system further includes: providing an indication that the at least one sub-system is highly unlikely to be the root cause of the exhibited system error when the number of consecutive Green SOH results for the at least one sub-system is at least twenty.

According to another aspect of the present disclosure, repeatedly monitoring, at a specified time interval, the state of health (SOH) for the at least one sub-system further includes: repeatedly monitoring, at a specified time interval, the state of health (SOH) for the at least one sub-system whenever the system is running.

According to another aspect of the present disclosure, the method further includes resetting the number of consecutive Green SOH results to zero when the system has not been running for longer than a pre-determined time interval.

According to several aspects of the present disclosure, a method of diagnosing a root cause for an exhibited vehicle failure, comprises initiating a vehicle health management (VHM) algorithm whenever the engine of the vehicle is started, running the VHM algorithm whenever the engine of the vehicle is running, repeatedly monitoring, at a specified time interval, the state of health (SOH) for the at least one vehicle component, wherein the SOH for the at least one vehicle component is one of Green, Yellow, and Red, calculating a number of consecutive Green SOH results for the at least one vehicle component, resetting the number of consecutive Green SOH results to zero when the engine of the vehicle has not been started for longer than a pre-determined time interval and when the vehicle has not moved between consecutive engine starts, and providing an indication of likelihood that the at least one vehicle component is not a root cause of the exhibited vehicle failure based on the number of consecutive Green SOH results for the at least one vehicle component.

According to another aspect of the present disclosure, providing an indication of likelihood that the at least one vehicle component is not a root cause of the vehicle failure based on the number of consecutive Green SOH results for the at least one vehicle component further includes: providing no indication of the likelihood that the at least one vehicle component is not a root cause of the exhibited vehicle failure when the number of consecutive Green SOH results for the at least one vehicle component is less than ten.

According to another aspect of the present disclosure, providing an indication of likelihood that the at least one vehicle component is not a root cause of the vehicle failure based on the number of consecutive Green SOH results for the at least one vehicle component further includes: providing an indication that the at least one vehicle component is unlikely to be the root cause of the exhibited vehicle failure when the number of consecutive Green SOH results for the at least one vehicle component is at least ten.

According to another aspect of the present disclosure, providing an indication of likelihood that the at least one vehicle component is not a root cause of the vehicle failure based on the number of consecutive Green SOH results for the at least one vehicle component further includes: providing an indication that the at least one vehicle component is highly unlikely to be the root cause of the exhibited vehicle failure when the number of consecutive Green SOH results for the at least one vehicle component is at least twenty.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
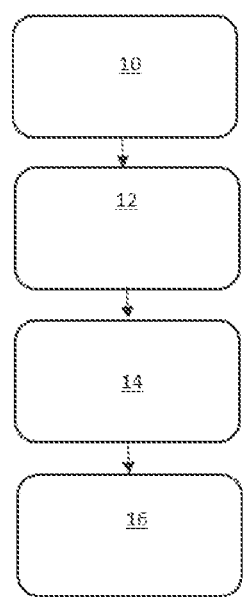
FIG. 1 is a block diagram of a method according to an exemplary embodiment.

Referring to FIG. 1, a block diagram of a method of diagnosing the root cause of an exhibited vehicle failure of an exemplary embodiment of the present disclosure is shown. Starting at block 10, the method includes initiating a vehicle health management (VHM) algorithm. VHM systems are known to those skilled in the art. The VHM algorithm gathers information from sensors within the vehicle to monitor performance characteristics of various components within the vehicle. The VHM algorithm helps to predict failures in vehicle components by tracking deteriorating or failing performance. The VHM algorithm is initiated whenever the engine of the vehicle is started and runs continuously for as long as the engine is running.

When the VHM algorithm is initiated, communication between a controller that runs the VHM algorithm and at least one sensor within the vehicle allows the algorithm to gather information from the at least one sensor to measure operating parameters for components in the vehicle. In an exemplary embodiment, the controller is located within the vehicle and communicates with various sensors in the vehicle via a communications bus. In another exemplary embodiment, the controller is located remotely from the vehicle. Sensors within the vehicle communicate with a communications bus within the vehicle. The controller communicates with the communications bus via a wireless network.

The controller is a non-generalized, electronic control device having a preprogrammed digital computer or processor, memory or non-transitory computer readable medium used to store data such as control logic, software applications, instructions, computer code, data, lookup tables, etc., and a transceiver or input/output ports. Computer readable medium includes any type of medium capable of being accessed by a computer, such as read only memory (ROM), random access memory (RAM), a hard disk drive, a solid-state drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Moving to block 12, the method includes repeatedly monitoring, at a specified time interval, the state of health (SOH) for at least one vehicle component. The VHM algorithm monitors multiple components and subsystems of the vehicle, as well as associated diagnostic data (e.g., detected faults or past failures) and prognostic data (e.g., remaining useful life or incipient failures), to give a component a SOH rating. At each time interval, the at least one vehicle component is monitored and given a SOH designation of Green, Yellow, or Red. Green is an indication that the vehicle component is operating as expected. Yellow is an indication that the VHM has detected reduced operating functionality in the component. Red is an indication that the component has failed.

By way of non-limiting example, the at least one vehicle component may be the battery of the vehicle. The VHM algorithm monitors, via sensors within the vehicle, operating parameters for the battery. Operating parameters that may be measured includes, state of charge, open circuit voltage, minimum crank voltage, crank time, and battery internal resistance. Measurement of these operating parameters allow the VHM algorithm to evaluate the over-all health of the battery and to provide a SOH status for the battery.

Moving to block 14, the method further includes calculating a number of consecutive Green SOH results for the at least one vehicle component. At each interval, the number of consecutive Green SOH results for the at least one vehicle component is either increased by one, or re-set to zero.

In an exemplary embodiment, the number of consecutive Green SOH results for the at least one vehicle component is re-set to zero when the engine of the vehicle has not been started for longer than a pre-determined time interval. If the vehicle is stored, or not used for long periods of time, the previous occurrences of Green SOH results may no longer be relevant, and are therefore disregarded. By way of non-limiting example, if the vehicle has not been started for more than 48 hours, the number of consecutive Green SOH results for the at least one vehicle component is re-set to zero. 48 hours is an arbitrary but conservative threshold in this case.

In another exemplary embodiment, the number of consecutive Green SOH results for the at least one vehicle component is re-set to zero when the vehicle has not moved between consecutive engine starts. In circumstances where the vehicle is in a service garage, a service technician may start the engine of the vehicle multiple times, while the vehicle remains stationary. Likewise, in circumstances where the vehicle has moved very little, or less than a pre-determined distance between consecutive engine starts, the number of consecutive Green SOH results for the at least one vehicle component is re-set to zero. In this instance, the short distance may be an indication that the vehicle was only moved by a service technician, or taken for a test drive. Occurrences of Green SOH results during these periods may not be an accurate representation of the SOH of the vehicle component, and are therefore disregarded.

If conditions do not indicate that the accumulated count of consecutive Green results for the at least one vehicle component are to be re-set to zero, then the accumulated count of consecutive Green results for the at least one vehicle component is increased by one. Moving to block 16, the method finally includes providing an indication of likelihood that the at least one vehicle component is not a root cause of the exhibited vehicle failure based on the number of consecutive Green SOH results for the at least one vehicle component.

It is important that an indication of the likelihood that the at least one vehicle component is not a root cause of the vehicle failure is only given in circumstances where there is compelling information to that effect. Therefore, no indication of the likelihood that the at least one vehicle component is not a root cause of the exhibited vehicle failure is given when the number of consecutive Green SOH results for the at least one vehicle component is less than a first pre-determined threshold. This avoids misinterpretation of the conclusion where the evidence is considered weak. By way of non-limiting example, the first pre-determined threshold is ten consecutive occurrences of Green SOH results. Any time the accumulated number of consecutive occurrences of Green SOH results is less than ten, no indication is given regarding the likelihood that the at least one vehicle component is not the root cause of the vehicle failure.

An indication that the at least one vehicle component is unlikely to be the root cause of the exhibited vehicle failure is provided when the number of consecutive Green SOH results for the at least one vehicle component is at least equal to the first pre-determined threshold. Therefore, using the same pre-determined threshold given in the example above, if the number of Green SOH results for the at least one vehicle component is at least ten, an indication will be given that indicates it is unlikely, with a reasonable level of confidence, that the a least one vehicle component has failed, or is failing, and is therefore, not the root cause of the vehicle failure.

An indication that the at least one vehicle component is unlikely to be the root cause of the exhibited vehicle failure is further provided when the number of consecutive Green SOH results for the at least one vehicle component is at least equal to a second pre-determined threshold that is greater than the first pre-determined threshold. Therefore, by way of a non-limiting example, if the number of Green SOH results for the at least one vehicle component is at least twenty, an indication will be given that indicates it is unlikely, with a high level of confidence, that the a least one vehicle component has failed, or is failing, and is therefore, not the root cause of the vehicle failure.

The distinction between a reasonable level of confidence and a high level of confidence allows the operator of the vehicle, or a service technician to evaluate with more certainty how much reliance can be placed on the indication received.

Figure 2:
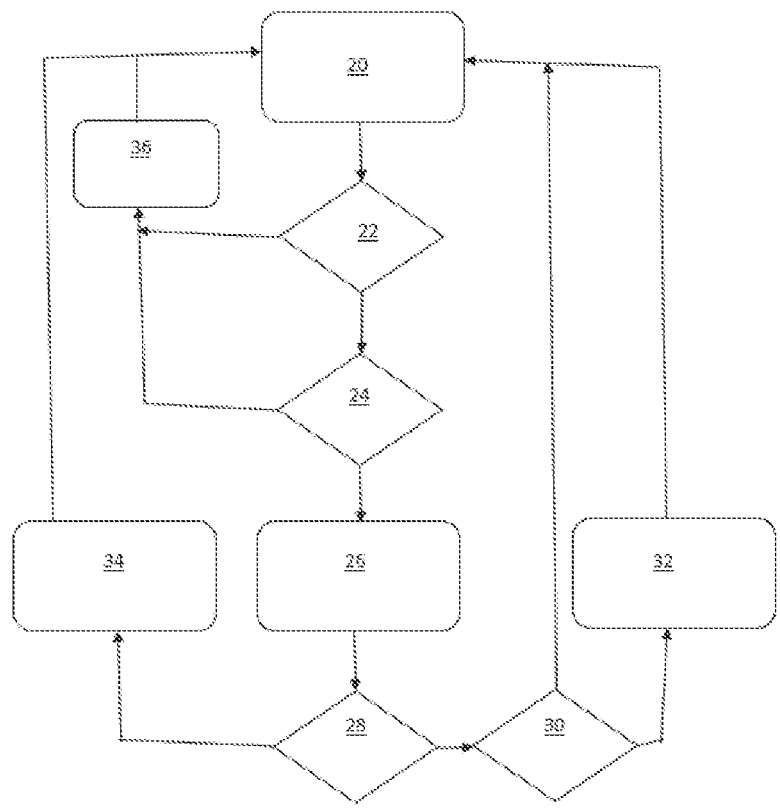
FIG. 2 is a flow chart illustrating the operation of the method shown in FIG. 1.

Referring to FIG. 2, a flow chart illustrates operation of an exemplary embodiment of the method described above. Starting at block 20, the VHM algorithm evaluates the operating parameters for a vehicle component, such as the battery of a vehicle and give the component a SOH designation of Red, Yellow, or Green. Moving to decision block 22, if the SOH designation is Green, the flow chart continues on to decision block 24. If the SOH designation is Yellow or Red, the flow chart continues on to block 36, where the accumulated number of consecutive Green SOH results is re-set to zero.

At decision block 24, the amount of time that has passed since the last SOH designation was made is compared to a pre-determined time interval. If the amount of time that has passed exceeds the pre-determined time interval, the flow chart continues on to block 36, where the accumulated number of consecutive Green SOH results is re-set to zero.

Simultaneously, the current mileage of the vehicle is compared to the mileage of the vehicle when the last SOH designation was made. If the current mileage of the vehicle is equal to the mileage of the vehicle when the last SOH designation was made, the flow chart continues on to block 36, where the accumulated number of consecutive Green SOH results is re-set to zero.

If the amount of time that has passed does not exceed the pre-determined time interval, and if the current mileage of the vehicle is greater than the mileage of the vehicle when the last SOH designation was made, the flow chart continues on to block 26, where the number of consecutive Green SOH results is increased by one and the flow chart continues to decision block 28.

At block 28, the number of consecutive Green SOH results is compared to a second pre-determined threshold. By way of non-limiting example, the second pre-determined threshold is twenty. If the number of consecutive Green SOH results is twenty or more, then the flow chart continues on to block 34, where an indication that there is a high level of confidence that the vehicle component is not the root cause of a vehicle failure is provided. The flow chart then returns to block 20, carrying forward the accumulated number of consecutive Green SOH results.

If the number of consecutive Green SOH results is less than twenty, the flow chart continues on to block 30, where the number of consecutive Green SOH results is compared to a first pre-determined threshold. By way of non-limiting example, the first pre-determined threshold is ten. If the number of consecutive Green SOH results is ten or more, then the flow chart continues on to block 32, where an indication that there is a reasonable level of confidence that the vehicle component is not the root cause of a vehicle failure is provided. The flow chart then returns to block 20, carrying forward the accumulated number of consecutive Green SOH results. At block 20, the process begins again and is repeated at a pre-determined time interval for as long as the engine of the vehicle is running.

It should be understood, that the method of the present disclosure is not limited to vehicle applications, and would be equally effective in providing an indication of the likelihood that a sub-system is not a root cause of a system failure.

Figure 3:
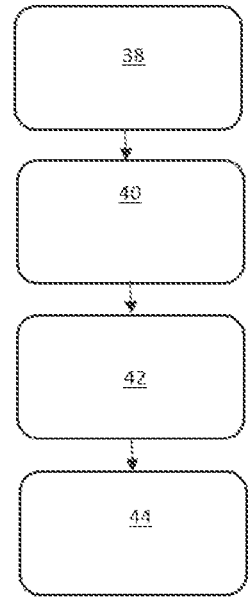
FIG. 3 is a block diagram according to another exemplary embodiment.

Referring to FIG. 3, a block diagram of a method of diagnosing the root cause of a system failure of an exemplary embodiment of the present disclosure is shown. Starting at block 38, the method includes initiating an algorithm, ran by a system controller, that gathers information to monitor performance characteristics of various sub-systems. The algorithm helps to predict failures in sub-systems by tracking deteriorating or failing performance. The algorithm is initiated whenever the system is started and continues for as long as the system is running.

The system controller is a non-generalized, electronic control device having a preprogrammed digital computer or processor, memory or non-transitory computer readable medium used to store data such as control logic, software applications, instructions, computer code, data, lookup tables, etc., and a transceiver or input/output ports. Computer readable medium includes any type of medium capable of being accessed by a computer, such as read only memory (ROM), random access memory (RAM), a hard disk drive, solid-state drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device. Computer code includes any type of program code, including source code, object code, and executable code.

Moving to block 40, the method includes repeatedly monitoring, at a specified time interval, the state of health (SOH) for at least one sub-system. The algorithm monitors multiple subsystems, as well as associated diagnostic data (e.g., detected faults or past failures) and prognostic data (e.g., remaining useful life or incipient failures), to give a sub-system a SOH rating. At each time interval, the at least one sub-system is monitored and given a SOH designation of Green, Yellow, or Red. Green is an indication that the sub-system is operating as expected. Yellow is an indication that the algorithm has detected reduced operating functionality in the sub-system. Red is an indication that the sub-system has failed.

Moving to block 42, the method further includes calculating a number of consecutive Green SOH results for the at least one sub-system. At each interval, the number of consecutive Green SOH results for the at least one sub-system is either increased by one, or re-set to zero.

In an exemplary embodiment, the number of consecutive Green SOH results for the at least one sub-system is re-set to zero when the system has not run for longer than a pre-determined time interval. If the system is dormant, or not used for long periods of time, the previous occurrences of Green SOH results may not be relevant, and are therefore disregarded. By way of non-limiting example, if the system has not been running for more than 48 hours, the number of consecutive Green SOH results for the at least one sub-system is re-set to zero.

If conditions do not indicate that the accumulated count of consecutive Green results for the at least one sub-system are to be re-set to zero, then the accumulated count of consecutive Green results for the at least one sub-system is increased by one. Moving to block 44, the method finally includes providing an indication of likelihood that the at least one sub-system is not a root cause of a system failure based on the number of consecutive Green SOH results for the at least one sub-system.

It is important that an indication of the likelihood that the at least one sub-system is not a root cause of the system failure is only given in circumstances where there is compelling information to that effect. Therefore, no indication of the likelihood that the at least one sub-system is not a root cause of a system failure is given when the number of consecutive Green SOH results for the at least one sub-system is less than a first pre-determined threshold. By way of non-limiting example, the first pre-determined threshold is ten consecutive occurrences of Green SOH results. Any time the accumulated number of consecutive occurrences of Green SOH results is less than ten, no indication is given regarding the likelihood that the at least one sub-system is not the root cause of the system failure.

An indication that the at least one sub-system is unlikely to be the root cause of a system failure is provided when the number of consecutive Green SOH results for the at least one sub-system is at least equal to the first pre-determined threshold. Therefore, using the same pre-determined threshold given in the example above, if the number of Green SOH results for the at least one sub-system is at least ten, an indication will be given that indicates it is unlikely, with a reasonable level of confidence, that the a least one subsystem has failed, or is failing, and is therefore, not the root cause of the system failure.

An indication that the at least one sub-system is unlikely to be the root cause of a system failure is further provided when the number of consecutive Green SOH results for the at least one sub-system is at least equal to a second pre-determined threshold that is greater than the first pre-determined threshold. Therefore, by way of a non-limiting example, if the number of Green SOH results for the at least one sub-system is at least twenty, an indication will be given that indicates it is unlikely, with a high level of confidence, that the a least one sub-system has failed, or is failing, and is therefore, not the root cause of the system failure.

The distinction between a reasonable level of confidence and a high level of confidence allows a technician to evaluate with more certainty how much reliance can be placed on the indication received.

A method of the present disclosure offers several advantages. The method tracks and keeps count of the number of consecutive Green SOH results from the VHM assessments to build a component/system "goodness" confidence measure and as appropriate, delivers compelling vehicle component status information to the operator of the vehicle or service technician to bias the service technician away from potential inappropriate part replacements thereby reducing "no trouble found" (NTF) replacements and the associated warranty costs. The method of the current disclosure alters the conventional diagnostic process to take advantage of evidence that given components or subsystems are operating correctly in addition to the normal process which relies heavily upon symptoms of things that are not operating correctly. This use of positive evidence complements the traditional use of negative evidence and thus improves the performance of the diagnostic process itself to be both faster and more accurate.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method of diagnosing a root cause for an exhibited vehicle failure, comprising:
    initiating a vehicle health management (VHM) algorithm;
    repeatedly monitoring, at a specified time interval, the state of health (SOH) for at least one vehicle component, wherein the SOH for the at least one vehicle component is categorized as one of Green, Yellow, and Red;
    calculating a number of consecutive Green SOH results for the at least one vehicle component; and
    providing an indication of likelihood that the at least one vehicle component is not the root cause of the exhibited vehicle failure based on the number of consecutive Green SOH results for the at least one vehicle component.

2. The method of claim 1, wherein, the providing the indication of likelihood that the at least one vehicle component is not the root cause of the vehicle failure based on the number of consecutive Green SOH results for the at least one vehicle component further includes: providing no indication of the likelihood that the at least one vehicle component is not a root cause of the exhibited vehicle failure when the number of consecutive Green SOH results for the at least one vehicle component is less than a first pre-determined threshold.

3. The method of claim 2, wherein, the providing the indication of likelihood that the at least one vehicle component is not the root cause of the vehicle failure based on the number of consecutive Green SOH results for the at least one vehicle component further includes: providing an indication that the at least one vehicle component is unlikely to be the root cause of the exhibited vehicle failure when the number of consecutive Green SOH results for the at least one vehicle component is greater than or equal to the first pre-determined threshold.

4. The method of claim 3, wherein, the providing the indication of likelihood that the at least one vehicle component is not the root cause of the vehicle failure based on the number of consecutive Green SOH results for the at least one vehicle component further includes: providing an indication that the at least one vehicle component is unlikely, with a high level of confidence, to be the root cause of the exhibited vehicle failure when the number of consecutive Green SOH results for the at least one vehicle component is greater than or equal to a second pre-determined threshold, wherein the second pre-determined threshold is greater than the first pre-determined threshold.

5. The method of claim 1, wherein the initiating the[[a]] vehicle health management (VHM) algorithm further includes:
    initiating the VHM algorithm whenever the engine of the vehicle is started.

6. The method of claim 5, wherein the initiating the VHM algorithm whenever the engine of the vehicle is started further includes: running the VHM algorithm whenever the engine of the vehicle is running.

7. The method of claim 5, further including: resetting the number of consecutive Green SOH results to zero when the engine of the vehicle has not been started for longer than a pre-determined time interval.

8. The method of claim 5, further including: resetting the number of consecutive Green SOH results to zero when the vehicle has not moved between consecutive engine starts.

9. The method of claim 1, wherein the initiating the VHM algorithm further includes: initiating communication between a controller and at least one sensor within the vehicle, wherein the controller is adapted to run the VHM algorithm, and the at least one sensor is adapted to monitor SOH conditions for the at least one vehicle component.

10. The method of claim 9, wherein the controller is located remotely from the vehicle, and the initiating communication between the controller and the at least one sensor within the vehicle includes: initiating communication between the controller and the at least one sensor within the vehicle via a wireless network.

11. A method of diagnosing a root cause for an exhibited system error, comprising:
    repeatedly monitoring, at a specified time interval, the state of health (SOH) for at least one sub-system, wherein the SOH for the at least one sub-system is categorized as one of Green, Yellow, and Red;
    calculating a number of consecutive Green SOH results for the at least one sub-system; and
    providing an indication of likelihood that the at least one sub-system is not a root cause of the exhibited system error based on the number of consecutive Green SOH results for the at least one sub-system.

12. The method of claim 11, wherein, the providing the indication of likelihood that the at least one sub-system is not the root cause of the system failure based on the number of consecutive Green SOH results for the at least one sub-system further includes: providing no indication of the likelihood that the at least one sub-system is not the root cause of the exhibited system error when the number of consecutive Green SOH results for the at least one sub-system is less than ten.

13. The method of claim 12, wherein, the providing the indication of likelihood that the at least one sub-system is not the root cause of the system error based on the number of consecutive Green SOH results for the at least one sub-system further includes: providing an indication that the at least one sub-system is unlikely to be the root cause of the exhibited system error when the number of consecutive Green SOH results for the at least one sub-system is greater than or equal to ten.

14. The method of claim 13, wherein, the providing the indication of likelihood that the at least one sub-system is not the root cause of the system error based on the number of consecutive Green SOH results for the at least one sub-system further includes: providing an indication that the at least one sub-system is unlikely, with a high level of confidence, to be the root cause of the exhibited system error when the number of consecutive Green SOH results for the at least one sub-system is greater than or equal to twenty.

15. The method of claim 11, wherein the repeatedly monitoring, at the specified time interval, the state of health (SOH) for the at least one sub-system further includes: repeatedly monitoring, at the specified time interval, the state of health (SOH) for the at least one sub-system whenever the system is running.

16. The method of claim 15, further including: resetting the number of consecutive Green SOH results to zero when the system has not been running for longer than a pre-determined time interval.

17. A method of diagnosing a root cause for an exhibited vehicle failure, comprising:
    initiating a vehicle health management (VHM) algorithm whenever anthe engine of the vehicle is started;
    running the VHM algorithm whenever the engine of the vehicle is running;
    repeatedly monitoring, at a specified time interval, the state of health (SOH) for at least one vehicle component, wherein the SOH for the at least one vehicle component is categorized as one of Green, Yellow, and Red;
    calculating a number of consecutive Green SOH results for the at least one vehicle component;
    resetting the number of consecutive Green SOH results to zero when the engine of the vehicle has not been started for longer than a pre-determined time interval and when the vehicle has not moved between consecutive engine starts; and
    providing an indication of likelihood that the at least one vehicle component is not a root cause of the exhibited vehicle failure based on the number of consecutive Green SOH results for the at least one vehicle component.

18. The method of claim 17, wherein, the providing the indication of likelihood that the at least one vehicle component is not the root cause of the vehicle failure based on the number of consecutive Green SOH results for the at least one vehicle component further includes: providing no indication of the likelihood that the at least one vehicle component is not the root cause of the exhibited vehicle failure when the number of consecutive Green SOH results for the at least one vehicle component is less than ten.

19. The method of claim 18, wherein, the providing the indication of likelihood that the at least one vehicle component is not the root cause of the vehicle failure based on the number of consecutive Green SOH results for the at least one vehicle component further includes: providing an indication that the at least one vehicle component is unlikely to be the root cause of the exhibited vehicle failure when the number of consecutive Green SOH results for the at least one vehicle component is greater than or equal to ten.

20. The method of claim 19, wherein, the providing the indication of likelihood that the at least one vehicle component is not the root cause of the vehicle failure based on the number of consecutive Green SOH results for the at least one vehicle component further includes: providing an indication that the at least one vehicle component is unlikely, with a high level of confidence, to be the root cause of the exhibited vehicle failure when the number of consecutive Green SOH results for the at least one vehicle component is greater than or equal to twenty.

* * * * *